United States Patent [19]

Ohmori et al.

[11] Patent Number: 5,786,103
[45] Date of Patent: Jul. 28, 1998

[54] SOFT MAGNETIC FILM AND MAGNETIC HEAD EMPLOYING SAME

[75] Inventors: Hiroyuki Ohmori; Mitsuharu Shouji; Tetsuya Yamamoto, all of Kanagawa; Yasunari Sugiyama, Tokyo, all of Japan

[73] Assignee: Sony Corporation, Tokyo, Japan

[21] Appl. No.: 672,043

[22] Filed: Jun. 26, 1996

[30] Foreign Application Priority Data

Jun. 28, 1995 [JP] Japan ............... 7-162158

[51] Int. Cl.$^6$ ............... G11B 5/66; G11B 5/70; B32B 9/00
[52] U.S. Cl. ............... 428/694 R; 428/694 T; 428/692; 428/900; 307/106; 307/415; 336/213; 335/297; 148/304; 148/403
[58] Field of Search ............... 428/694 R, 694 T, 428/692, 900; 307/106, 415; 336/213; 335/297; 148/304, 403

[56] References Cited

U.S. PATENT DOCUMENTS 4,762,755   8/1988   Shiiki et al. ............... 428/635
5,585,984  12/1996   Hasegawa et al. ............... 360/113

OTHER PUBLICATIONS

J.P. 04119511 Pat. Abstract; Derwent Information.
J.P. 04252406 Pat. Abstract; Derwent Information.
J.P. 05225521A Patent Abstract.

*Primary Examiner*—Daniel Zirker
*Attorney, Agent, or Firm*—Hill & Simpson

[57] ABSTRACT

A soft magnetic film having a high saturation magnetic flux density and superior soft magnetic properties and capable of maintaining superior soft magnetic properties when worked to a magnetic head. The magnetic film is represented by the general formula of $Fe_xM_yL_zJ_uQ_w$, wherein M denotes at least one selected from the group of Ru, Cr, Ti, Mo, W and Rh, L denotes at least one selected from the group of Y, Hf, Zr, Ta and Nb, J denotes at least one of Al and Ga, Q denotes at least one of Si and Ge and x, y, z, u and w denote the proportions of respective atoms in atom %, and wherein the composition is given by $68 \leq x < 80$, $3 \leq y < 12$, $3 < z < 5$, $0 \leq u < 10$ and $10 < w < 25$. The soft magnetic film is formed on non-magnetic or magnetic ceramics and worked into a magnetic head.

8 Claims, 6 Drawing Sheets

SOFT MAGNETIC FILM AND MAGNETIC HEAD EMPLOYING SAME

BACKGROUND OF THE INVENTION

1. Field of the Invention

This invention relates to a soft magnetic film employed as a core of a magnetic head and, more particularly, to a magnetic head employing this soft magnetic film.

2. Description of Related Art

In a magnetic recording and/or reproducing apparatus, such as a video tape recorder (VTR), researches are being conducted towards raising the recording density of recording signals for improving the picture quality. For coping with these researches, development of a high coercivity medium, including a so-called metal tape employing powders of magnetic metals, such as Fe, Co or Ni, or a so-called evaporated tape, comprised of a magnetic metal material deposited directly on a base film by deposition techniques, such as vapor deposition, is going on briskly.

With increased coercivity of the magnetic recording medium, a head material of a magnetic head used for recording/reproduction is required to have high saturation magnetic flux density. The ferrite material used extensively as a head material, for example, is low in saturation magnetic flux density and cannot sufficiently cope with the tendency towards higher coercivity of the recording medium.

In this consideration, there have been developed a compound type magnetic head in which a magnetic core of the magnetic head is of a compound structure comprised of a ferrite or ceramics and soft magnetic films having a-high saturation magnetic flux density, and a magnetic gap is defined by abutting the magnetic films to each other, and a thin film magnetic head, in which magnetic cores or coils are formed by a thin-film technique and layered in a multi-layer structure with insulating films in-between.

As the soft magnetic materials used for the above magnetic heads, amorphous soft magnetic films of, for example, Fe-Al-Si alloys (so-called sendust alloy), or Co-Nb-Zr, are known. These soft magnetic materials have a high saturation magnetic flux density exceeding 1 teras.

For high density magnetic recording, a high saturation magnetic flux density is required of a soft magnetic film employed for a magnetic head core material. Heretofore, the Fe-Al-Si alloys or amorphous alloys have been used, as discussed above. However, with the composition of these alloys in which optimum soft magnetic properties and thermal stability may be realized, the saturation magnetic flux density is on the order of 10 k Gauss, despite the fact that a saturation magnetic flux density higher than this is demanded if the soft magnetic film is used as a magnetic head for high density recording.

The soft magnetic film, having the composition of Fe-Ru-Ga-Si, developed by the present Assignee, is superior in soft magnetic properties and has a saturation magnetic flux on the order of 1.2 teras and thus exhibits superior characteristics as a magnetic head core material.

For fabricating a magnetic head, it is necessary to grind a ceramic substrate and to form a soft magnetic film directly on the ground surface or with an interposition of an underlying layer. With the currently available material of the film, the film formed on such ground surface is deteriorated in magnetic properties or the film itself may be exfoliated.

SUMMARY OF THE INVENTION

It is therefore an object of the present invention to provide a soft magnetic film having a high saturation magnetic flux density as a magnetic core material and which is capable of maintaining superior soft magnetic properties when worked into a magnetic head.

It is another object of the present invention to provide a magnetic head having superior electro-magnetic conversion characteristics by having such magnetic head core material.

The present inventors have conducted perseverant researches for accomplishing the above object, and found that, by adding a moderate amount of elements such as Y, Hf or Zr to alloys such as Fe-Ru-Ga-Si or Fe-Al-Si, superior soft magnetic properties may be obtained even on a surface roughed due to machining operations.

The present invention resides in a soft magnetic film represented by the general formula of $Fe_xM_yL_zJ_uQ_w$, wherein M denotes at least one selected from the group of Ru, Cr, Ti, Mo, W and Rh, L denotes at least one selected from the group of Y, Hf, Zr, Ta and Nb, J denotes at least one of Al and Ga, Q denotes at least one of Si and Ge and x, y, z, u and w denote the proportions of respective atoms in atom %, and wherein the composition is shown by $68 \leq x < 80$, $3 \leq y < 12$, $3 < z < 5$, $0 \leq u < 10$ and $10 < w < 25$.

The present invention also resides in a magnetic head at least a portion of the magnetic core of which is constituted by the above magnetic film.

Basically, the soft magnetic film of the present invention is a crystallite alloy having the basic compositions of Fe-Al-Si, Fe-Ga-Si or Fe-Al-Ge, to which are added Ru, Cr, Ti, Mo, W and Rh for realizing an excellent soft magnetic film and improving abrasion resistance required of the magnetic head. In particular, addition of Ru leads to significant improvement of abrasion characteristics with only little lowering of the saturation magnetic flux density. The amount of addition of these elements is not lower than 3 atom % for realization of pre-set effects while being less than 12 atom % for preventing the lowering in the saturation magnetic flux density.

By adding metal elements, such as Y, Hf, Zr, Ta or Nb in the above ranges, a magnetic head may be produced which suffers from deterioration in magnetic properties to a lesser extent and which is superior in characteristics even if the film is formed on a roughed surface such as a machined surface used for fabricating a magnetic head.

The soft magnetic film of the present invention may be produced by a so-called gas phase plating, such as sputtering. The sputtering may be performed using an alloy target adjusted to give a desired composition. Alternatively, the sputtering may be performed by separately providing targets of respective atoms and adjusting the areas or impressed outputs thereof for controlling the composition. In particular, the former method is convenient for mass production since the film composition is determined substantially unequivocally by the target composition. The soft magnetic film is preferably formed on a non-magnetic or magnetic ceramics having the thermal expansion coefficient of $100 \times 10^{-7}$ to $140 \times 10^{-7}$.

The heat treatment temperature for the soft magnetic film of the present invention is preferably not lower than 500° C. and not higher than 750° C. in terms of the maximum heating temperature.

The soft magnetic film according to the present invention may be a sole film. Alternatively, it may be of a layered structure of magnetic metals, such as permalloy, non-magnetic metals, such as Ag or Cu or ceramic materials, such as $Si_3N_4$ or $SiO_2$.

The soft magnetic film may be used as a magnetic core of a magnetic head of an arbitrary structure, such as the aforementioned compound magnetic head or the thin-film magnetic head. The soft magnetic filing becomes most effective if at least a portion thereof has a surface roughness not lower than 0.1 μm. Addition of Ru, Cr, Ti, Mo, W or Rh to soft magnetic alloys, such as Fe-Ga-Si or Fe-Al-Si leads to improved resistance against abrasion. In particular, addition of Ru leads to significantly improved abrasion resistance with only little lowering of the saturation magnetic flux density.

By addition of metal elements, such as Y, Hf, Zr, Ta or Nb, to the soft magnetic alloys, there is no risk of deterioration of the magnetic properties of the magnetic film even if the magnetic film is formed on a roughed surface such as that produced on machining operations, thus assuring a high saturation magnetic flux density and superior soft magnetic properties.

By addition of a metal element, such as Ru, and metal elements, such as Y, Hf, Zr, Ta or Nb, to soft magnetic alloys, such as Fe-Ga-Si or Fe-Al-Si, a high magnetic flux density and superior soft magnetic properties and abrasion resistance may be achieved, so that, by utilizing the resulting material as a core material of a magnetic head, a magnetic head having superior playback performance may be produced.

With the soft magnetic film of the present invention, it becomes possible to realize superior heat-resistant characteristics up to 500° C. to 800° C., broad flexibility of the substrate with respect to thermal expansion coefficients and sufficient magnetic properties even on film forming on a coarse substrate surface poor in planarity, thus allowing to produce a magnetic head having excellent recording/playback characteristics.

DESCRIPTION OF THE PREFERRED EMBODIMENTS

By having reference to experimental results, preferred embodiments of the present invention will be explained in detail.

In the present embodiments, soft magnetic films were formed by dc magnetron sputtering, using an alloy target having a diameter of 100 mm, under the following film-forming conditions:

Sputtering Conditions

Vacuum Reached, $2 \ 10^{-4}$ Pa;

Ar gas pressure, 0.5 Pa;

Making power, 400 W

The films were formed to thicknesses of 10 μm.

Under the above conditions, a number of samples having various compositions were produced and measurement was made of coercivity, magnetic permeability and the saturation magnetic flux density of the produced samples.

Meanwhile, coercivity Hc and magnetic permeability were measured using a B-H loop tracer and a magnetic permeability measurement unit in the shape of a figure eight. The saturation magnetic flux density was measured using a sample vibration type magnetometer.

Figure 1:
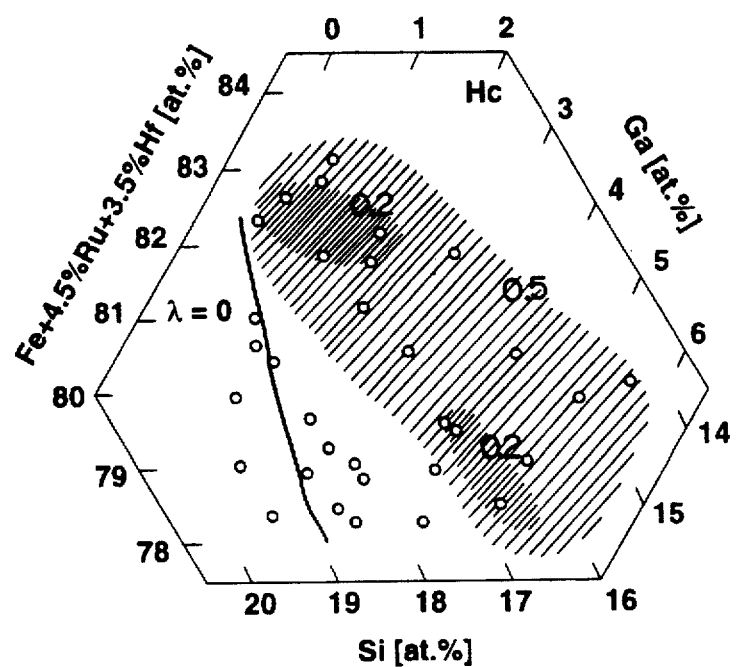
FIG. 1 is a diagram showing the relation among a target composition of a film annealed at 600° C., coercivity distribution and a zero magneto-striction curve.
Figure 2:
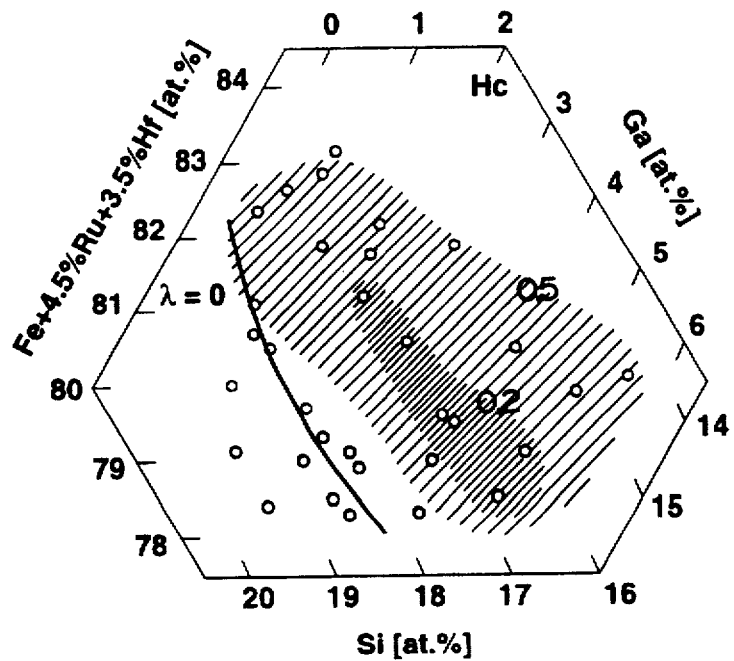
FIG. 2 is a diagram showing the relation among a target composition of a film annealed at 650° C., coercivity distribution and a zero magneto-striction curve.
Figure 3:
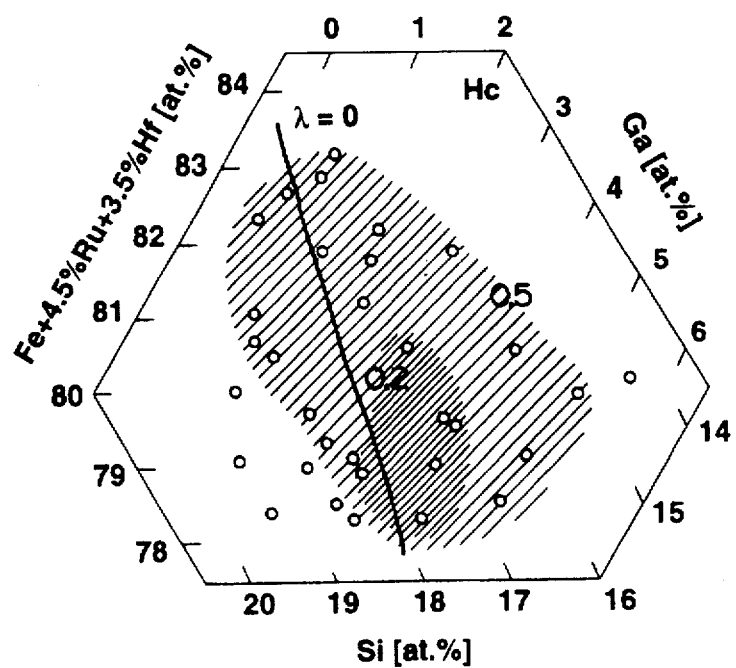
FIG. 3 is a diagram showing the relation among a target composition of a film annealed at 700° C., coercivity distribution and a zero magneto-striction curve.
Figure 4:
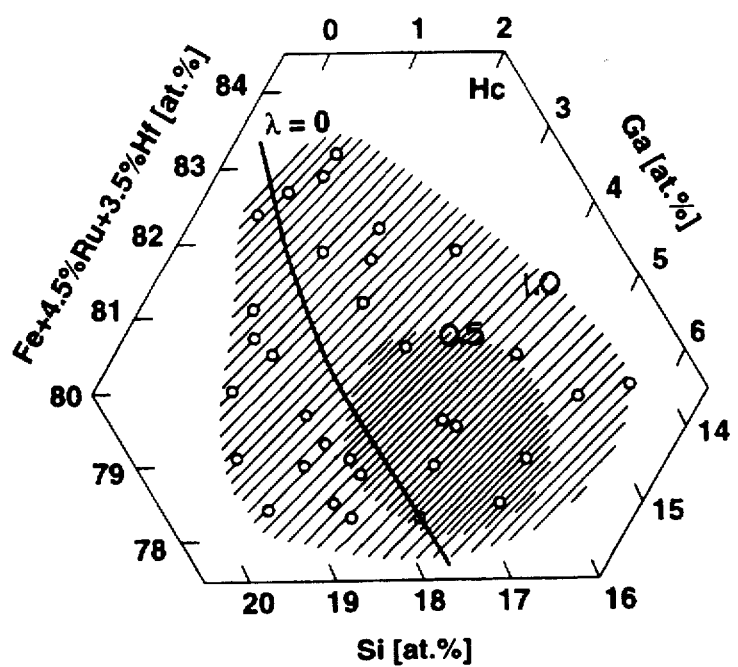
FIG. 4 is a diagram showing the relation among a target composition of a film annealed at 750° C., coercivity distribution and a zero magneto-striction curve.
Figure 5:
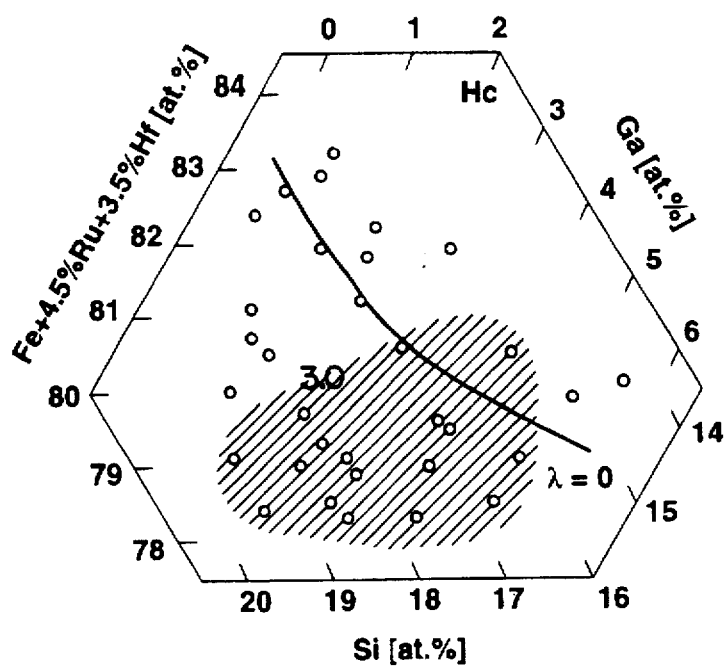
FIG. 5 is a diagram showing the relation among a target composition of a film annealed at 800° C., coercivity distribution and a zero magneto-striction curve.
Figure 6:
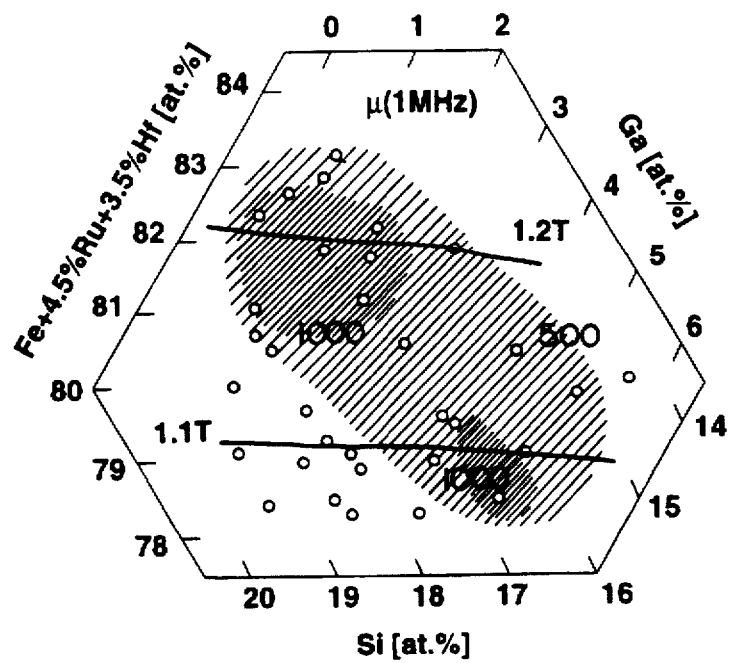
FIG. 6 is a diagram showing the relation among a target composition of a film annealed at 600° C., magnetic permeability and the saturation magnetic flux density.
Figure 7:
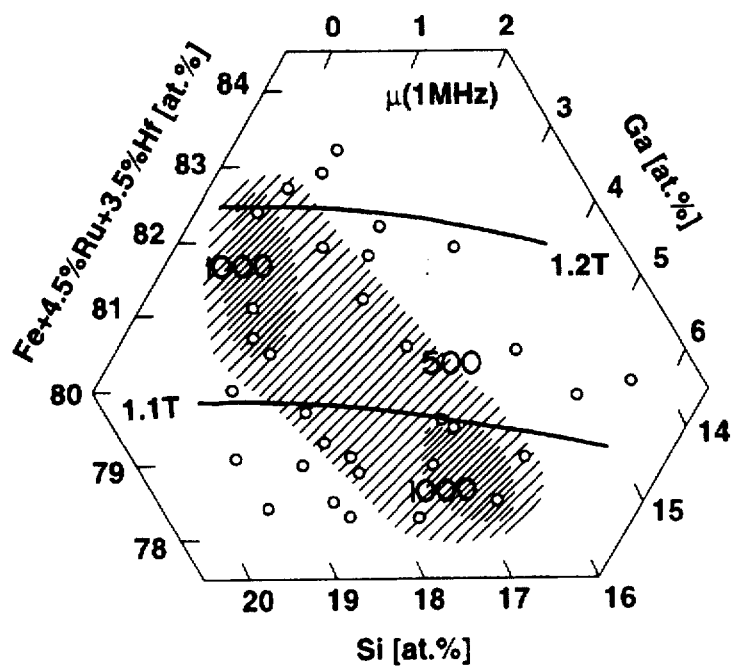
FIG. 7 is a diagram showing the relation among a target composition of a film annealed at 650° C., magnetic permeability and the saturation magnetic flux density.
Figure 8:
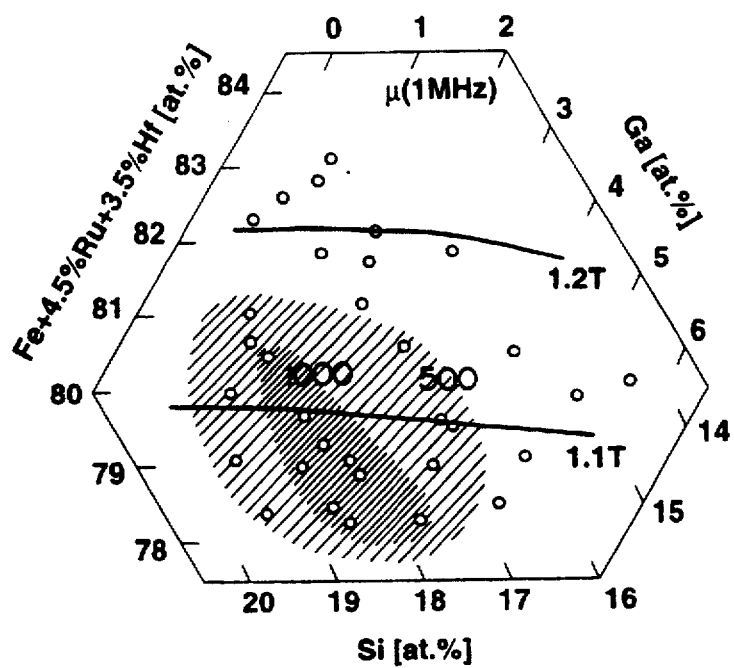
FIG. 8 is a diagram showing the relation among a target composition of a film annealed at 700° C., magnetic permeability and the saturation magnetic flux density.
Figure 9:
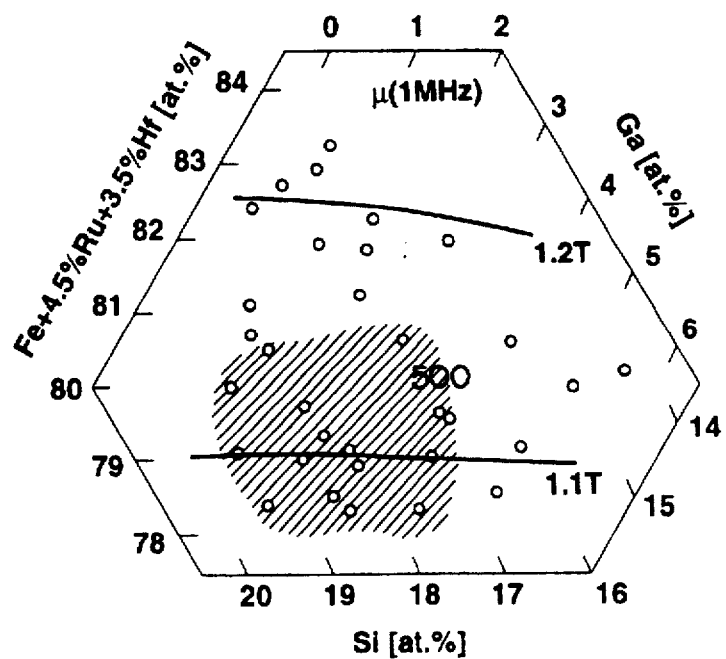
FIG. 9 is a diagram showing the relation among a target composition of a film annealed at 750° C., magnetic permeability and the saturation magnetic flux density.
Figure 10:
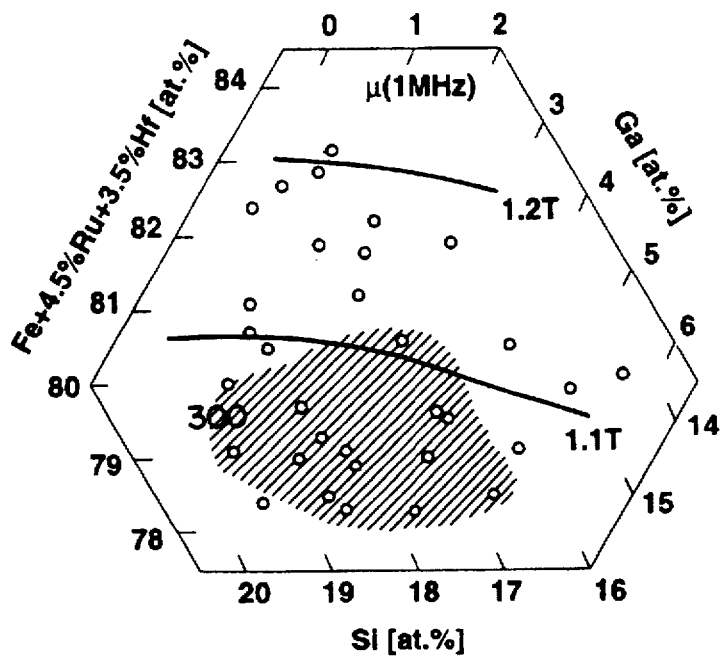
FIG. 10 is a diagram showing the relation among a target composition of a film annealed at 800° C., magnetic permeability and the saturation magnetic flux density.
Figure 11:
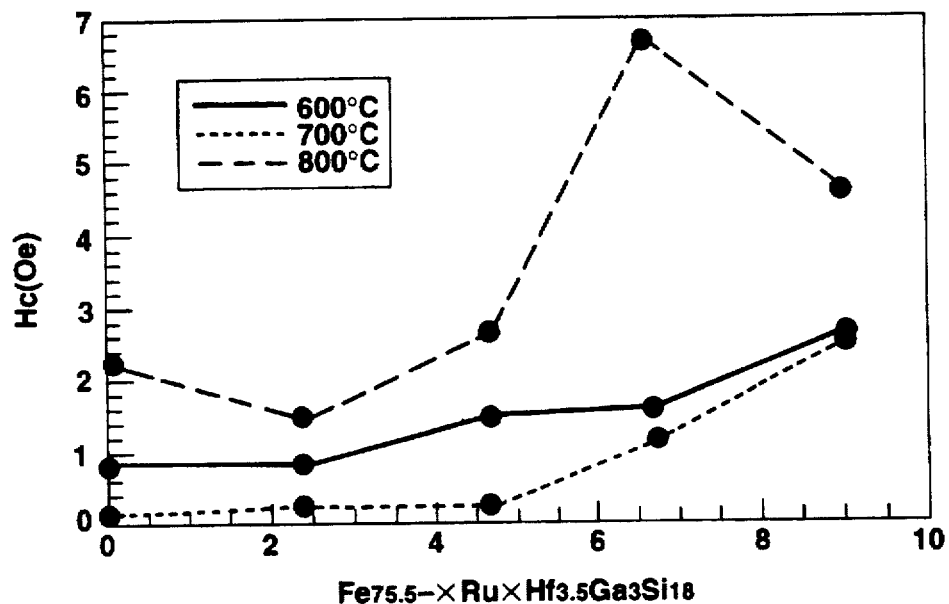
FIG. 11 is a graph showing Ru-dependency of coercivity in an Fe-Ru-Ga-Si alloy.
Figure 12:
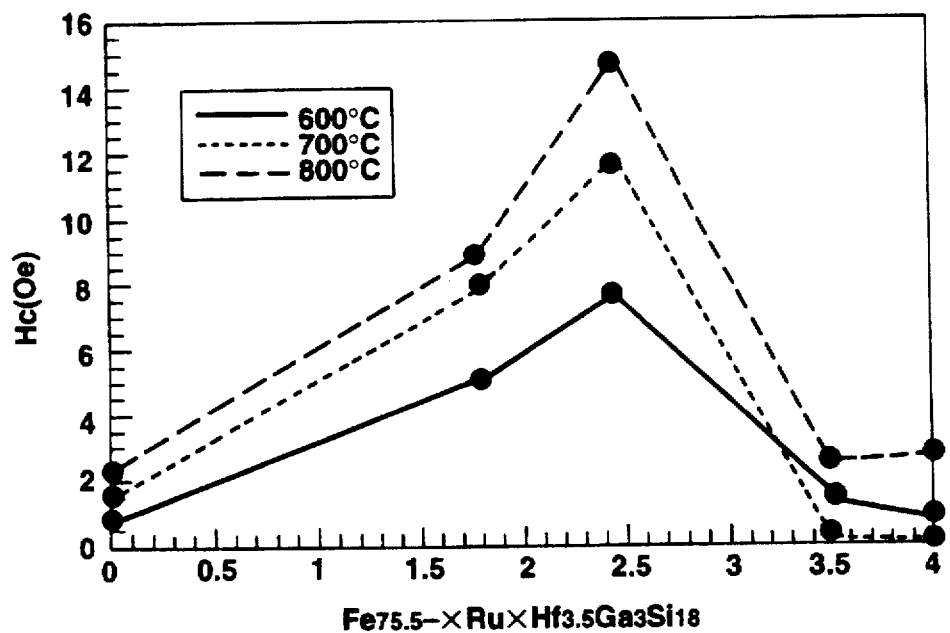
FIG. 12 is a graph showing Hf-dependency of coercivity in an Fe-Ru-Ga-Si alloy.

An Fe-Ru-Hf-Ga-Si alloy target was used as a sputtering target for film formation. For the cases of heat treatment at 600° C., 650° C., 700° C., 750° C. and 800° C., the target composition, zero magneto-striction line and coercivity are shown in FIGS. 1 to 5, while the saturation magnetic flux density and magnetic permeability at 1 MHz are shown in FIGS. 6 to 10. In addition, Ru and Hf dependency of coercivity of the Fe-Ru-Ga-Si alloy is shown in FIGS. 11 and 12, respectively.

An illustrative relation between coercivity and the saturation magnetic flux density for the combinations of Fe-Ru-Y-Ga-Si and Fe-Ru-Ta-Si is shown in Table 1:

TABLE 1

| film composition | coercivity | saturation magnetic flux density |
|---|---|---|
| $Fe_{68}Ru_4Y_3Ga_5Si_{20}$ | 0.3 Oe | 1.2 T |
| $Fe_{57}Ru_5Ta_4Ga_8Si_{18}$ | 0.2 Oe | 1.0 T |

Next, magnetic films having the compositions of $Fe_{68}Ru_4Hf_4Ga_6Si_{18}$ and $Fe_{67}Ru_6Ga_6Si_{17}$ were formed on substrates having different thermal expansion coefficients and measurements were made of the magnetic properties and film states. The results are shown in Table 2:

TABLE 2

| thermal expansion coefficient of substrates | Hc, $Fe_{7.5}Ru_{4.5}Hf_{3.5}Ga_{2.5}Si_{18}$ | $Fe_{68}Ru_8Ga_7Si_{17}$ |
|---|---|---|
| $90 \ 10^{-7}$ | film peeled | film peeled |
| $100 \ 10^{-7}$ | 0.5 Oe | film peeled |
| $120 \ 10^{-7}$ | 0.2 Oe | 0.3 Oe |
| $130 \ 10^{-7}$ | 0.2 Oe | 0.3 Oe |

TABLE 2-continued

| thermal expansion coefficient of substrates | Hc, $Fe_{7.5}Ru_{4.5}Hf_{3.5}Ga_{2.5}Si_{18}$ | $Fe_{68}Ru_8Ga_7Si_{17}$ |
|---|---|---|
| 140 $10^{-7}$ | 0.2 Oe | film peeled |
| 150 $10^{-7}$ | film peeled | film peeled |

It is seen from this Table 2 that the soft magnetic film of the present invention is adaptable to substrates having broad thermal expansion coefficients.

The relation between the surface roughness of non-magnetic substrates and magnetic properties, in case the substrate surfaces were roughed by mechanical processing and heat treatment was carried out at 700° C., is shown in Table 3:

TABLE 3

| substrate surface roughness | Hc, Fe—Ru—Hf—Ga—Si | Hc, Fe—Ru—Ga—Si |
|---|---|---|
| 300 nm | 0.2 Oe | 0.3 Oe |
| 0.1 um | 0.4 Oe | 3 Oe |
| 0.5 um | 0.5 Oe | 5 Oe |

It is seen from this Table 3 that the soft magnetic film of the present invention can have sufficient soft magnetic properties even on a roughed surface.

Next, compound type magnetic heads were fabricated using an Fe-Ru-Hf-Ga-Si magnetic film and an Fe-Ru-Ga-Si magnetic film and relative outputs thereof were compared. Table 4 shows the measured values of the relative outputs. Mn-Zn ferrite was used for a head substrate and a magnetic film was formed parallel to the gap surface of the magnetic head. The film thickness was set to 4 μm and the glass bonding at the magnetic gap was carried out at 550° C. Magnetic recording/reproduction was carried out by self recording/reproduction using a fixed head measurement unit. The magnetic tape was a metal tape having a coercivity of 1700 Oe and was run at a relative velocity of 10 m/s.

TABLE 4

| magnetic films of magnetic heads | relative output (10 MHz) | relative output (20 MHz) |
|---|---|---|
| Fe—Ru—Ga—Si | −12.3 dB | −20.5 dB |
| Fe—Ru—Hf—Ga—Si | −11.5 dB | −19.3 dB |

It is seen from Table 4 that the Fe-Ru-Hf-Ga-Si film is higher in output and exhibits better recording/reproducing properties.

We claim:

1. A soft magnetic film comprising:
   a soft magnetic film having the formula:
   $Fe_xRu_yL_zGa_uSi_w$, wherein L represents at least one metal selected from the group consisting of Y, Hf, Zr, Ta and Nb, x, y, z, u and w represent atomic percentages such that
   $68 \leq x < 80$
   $3 \leq y < 12$
   $3 < z < 5$
   $0 < u < 10$ and
   $10 < w < 25$.

2. A soft magnetic film as defined in claim 1, wherein the alloy is an Fe-Ru-Hf-Ga-Si alloy.

3. A soft magnetic film comprising an Fe-Ru-Y-Ga-Si alloy.

4. A soft magnetic film as defined in claim 1, wherein the alloy is an Fe-Ru-Ta-Ga-Si alloy.

5. A magnetic head comprising a magnetic core including a soft magnetic film comprising an alloy of the formula:
   Fe-Ru-L-Ga-Si, wherein L is at least one metal selected from the group consisting of Y, Hf, Zr, Ta and Nb, x, y, z, u and w represent atomic percentages such that
   $68 \leq x < 80$
   $3 \leq y < 12$
   $3 < z < 5$
   $0 < u < 10$ and
   $10 < w < 25$.

6. A soft magnetic film as defined in claim 5, wherein the alloy is an Fe-Ru-Hf-Ga-Si alloy.

7. A magnetic head comprising a magnetic core including a soft magnetic film comprising an Fe-Ru-Y-Ga-Si alloy.

8. A soft magnetic film as defined in claim 5, wherein the alloy is an Fe-Ru-Ta-Ga-Si alloy.

* * * * *